United States Patent [19]

Maulding et al.

[11] 3,994,820

[45] Nov. 30, 1976

[54] POLYMERS IN OXALATE CHEMILUMINESCENT SYSTEMS

[75] Inventors: Donald Roy Maulding, Branchburg Township, Somerset County; Michael Rauhut, Bridgewater Township, Somerville County, both of N.J.

[73] Assignee: American Cyanamid Company, Stamford, Conn.

[22] Filed: May 9, 1974

[21] Appl. No.: 468,618

Related U.S. Application Data

[63] Continuation of Ser. No. 264,219, June 19, 1972, abandoned.

[52] U.S. Cl. .................. 252/188.3 CL; 252/186
[51] Int. Cl.² ........................................ C09K 11/06
[58] Field of Search ...................... 252/188.3 CL

[56] References Cited
UNITED STATES PATENTS

| | | | |
|---|---|---|---|
| 2,420,286 | 5/1947 | Lacey et al. | 252/188.3 |
| 3,377,291 | 4/1968 | Winberg | 252/188.3 |
| 3,392,123 | 7/1968 | Winberg | 252/188.3 |
| 3,399,137 | 8/1968 | Rauhut et al. | 252/188.3 |
| 3,749,679 | 7/1973 | Rauhut | 252/188.3 |
| 3,816,325 | 6/1974 | Rauhut et al. | 252/188.3 |
| 3,816,326 | 6/1974 | Bollyky | 252/188.3 |

Primary Examiner—Herbert B. Guynn
Attorney, Agent, or Firm—Charles J. Fickey; Gordon L. Hart

[57] ABSTRACT

Novel, high light capacity chemiluminescent systems are disclosed. The high capacity is produced by adding a small amount of a polymer selected from the class consisting of: (1) homopolymers and copolymers of poly(alkylene oxides); (2) homopolymers and copolymers of poly(vinyl alkyl esters) and poly(vinyl alkyl ethers) with the optional inclusion of minor amounts of alkylenes and styrenes in said copolymers; (3) 1:1 alternating copolymers of maleic anhydride with alkylenes and styrenes; (4) cellulose esters and mixed cellulose esters of 2-, 3- and 4-carbon acids and mixtures of said esters with the poly(alkylene oxides), to a chemiluminescent system containing a bisaryloxylate, an organic fluorescer a peroxide, and an organic solvent.

8 Claims, No Drawings

POLYMERS IN OXALATE CHEMILUMINESCENT SYSTEMS

The invention herein described was made in the course of or under a contract or subcontract thereunder with The Department of the Navy.

This is a continuation of application Ser. No. 264,219, filed June 19, 1972, now abandoned.

This invention relates to high light capacity oxylate ester chemiluminescent light systems.

In copending, commonly assigned application Ser. No. 842,134, filed July 16, 1969, now abandoned certain improvements in the light capacity of oxalate ester light systems were disclosed. We have now found that greatly improved light capacity may be obtained by the addition of certain polymeric compounds to the system.

It is an object of this invention to provide an oxalate ester chemiluminescent light system having greater light capacity.

A further object is to provide an oxalate ester chemiluminescent light system that has greater brightness and longer life.

In general, any oxalate type ester chemiluminescent system may be employed in the present invention. Such systems comprise an oxalate type ester, a peroxide activator, a fluorescent compound to control the frequency of light emitted as a result of the reaction between the ester and the peroxide, a catalyst to accelerate the reaction and a solvent or mixture of solvents in which the other constituents are dissolved or suspended.

Suitable oxalate type esters include, for example, those represented by the following formula:

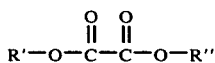

wherein R' and R'' are one or different members selected from the group consisting of:

I. Aryl groups: e.g., phenyl-, naphthyl-, and substituted aryl, typical substituents being: halo, such as, chloro, bromo or iodo; acyloxy, such as, benzoyloxy; carbonyl, such as, furmyl or acetyl; carboxyl, such as, carboxy; sulfo;

II. Heterocyclic groups: e.g., pyridyl-, acridinyl-, and substituted heterocyclic groups, typical substituents being: alkyl, such as, methyl, ethyl or octyl; halo, such as, chloro, bromo or iodo; acyloxy, such as, acetoxy; carbonyl, such as, formyl; carboxyl, such as, carboxy; alkoxy, such as, methoxy; amino, such as, triethylammonium; and, sulfo;

III. Unsaturated alkyl groups: e.g., vinyl-, ethynyl-, cyclo-, hexenyl-, isopropenyl-, and substituted derivatives thereof, typical substituents being halo, phenyl, cyano, carboxy groups, and the like;

IV. Electronegatively substituted groups: e.g., 1,1,1,3,3,3-hexafluoro-2-propyl-, 1,1,1,3,3,3-hexachloro-2-cyano-2-propyl-, perfluoro-t-butyl-, dicyanomethyl-, trimethyl-, ammoniummethyl-.

The oxalates of the following general formula are especially preferred in the practice of the present invention:

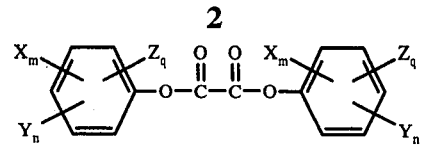

where: X represents one or more electronegative substituents, i.e., one having a Hammett sigma constant greater than zero, as previously defined, Y represents a carbalkoxy group, having $C_{1-12}$, $C_{1-5}$ being preferred, Z represents a hydrogen, alkyl or alkoxyalkyl group having $C_1$–$C_{12}$ hydrocarbon chains, $C_{1-5}$ being preferred, m, n and q are integers such that the combined Hammett sigma constant of the X, Y and Z substituents on each phenyl group is at least about 1.4 to 2.7. In the above, each of m and n is always at least one, q is 0, 1, 2 or 3.

$Xm$ may represent several different electronegative substituents. Moreover, the aryl oxalate may be additionally substituted by such non-electronegative substituents as alkyl and para-alkoxy, provided only that the sigma sum of all the substituents is at least about 1.4 to 2.7.

Among the especially preferred oxalates, one may mention, for example: bis(2-carbalkoxy-3,4,6-trichlorophenyl)oxalate, e.g., the 2-carbobutoxy and 2-carbopentoxy compounds, bis(3-carbalkoxy-2,4,6-trichlorophenyl)oxalate, bis(4-carbalkoxy-2,3,6-trichlorophenyl)oxalate, bis(3,5-dicarbalkoxy-2,4,6-trichlorophenyl)oxalate, bis(2,3-dicarbalkoxy-4,5,6-trichlorophenyl)oxalate, bis(2,4-dicarbalkoxy-3,5,6-trichlorophenyl)oxalate, bis(2,5-dicarbalkoxy-3,4,6-trichlorophenyl)oxalate, bis(2,6-dicarbalkoxy-3,4,5-trichlorophenyl)oxalate, bis(3-carbalkoxy-2,4,5,6-tetrachlorophenyl)oxalate, bis(2-carbalkoxy-3,4,5,6-tetrachlorophenyl)oxalate, bis(4-carbalkoxy-2,3,5,6-tetrachlorophenyl)oxalate, bis(6-carbalkoxy-2,3,4-trichlorophenyl)oxalate, bis(2,3-dicarbalkoxy-4,6-dichlorophenyl)oxalate, bis(3,6-dicarbalkoxy-2,4-dichlorophenyl)oxalate, bis(2,3,5-tricarbalkoxy-4,6-dichlorophenyl)oxalate, bis(3,4,5-tricarbalkoxy-2,6-dichlorophenyl)oxalate, bis(2,4,6-tricarbalkoxy-3,5-dichlorophenyl)oxalate, bis(3-bromo-6-carbohexoxy-2,4,5-trichlorophenyl)oxalate, bis(3-bromo-2-carbethoxy-4,6-dichlorophenyl)oxalate, bis(2-carbethoxy-4,6-dichloro-3-nitrophenyl)oxalate, bis[2-carbomethoxy-4,6-dichloro-3-(trifluoromethyl)phenyl]oxalate, bis(2-carbobutoxy-4,6-dichloro-3-cyanophenyl)oxalate, bis(2-carboctyloxy-4,5,6-trichloro-3-ethoxyphenyl)oxalate, bis(2-carbobutoxy-3,4,6-trichloro-5-ethoxyphenyl)oxalate, bis(2-carbisopropoxy-3,4,6-trichloro-5-methylphenyl)oxalate, bis(2-carbisopropoxy-4,6-dichloro-5-octylphenyl)oxalate, bis[2-carbomethoxy-3,5,6-trichloro-4-(1,1,3,3-tetramethylbutyl)-phenyl]oxalate, bis{2-[carbobis(trifluoromethyl)methoxy]- 3,4,5,6-tetrafluorophenyl}oxalate, bis(3,4,6-tribromo-2-carbocyclohexoxyphenyl)oxalate, bis(2,4,5-tribromo-6-carbophenoxy-3-hexadecylphenyl)oxalate, bis(2,4,5-trichloro-6-carbobutoxyphenyl)oxylate and bis(2,4,5-trichloro-6-carbopentoxyphenyl)oxalate.

The activator is typically a peroxide which is reactive with the oxalate type ester, such as, hydrogen peroxide.

Compounds which are generally suitable to catalyze the reaction between the activator and oxalate type esters are basic compounds, such as, for example, amines, hydroxides, alkoxides, carboxylic acid salts and phenolic salts. Preferred salts of carboxylic acids and phenols are derived from compounds having a pKa in the range of from about 1 to about 6 as measured in aqueous solution. Tetrabutylammonium salicylate and sodium salicylate are especially preferred.

Any solvent in which the other constituents are stable and soluble or suspendable are generally suitable for use in the present invention. A wide variety of organic solvents and mixtures thereof are suitable, such as, for example: carboxylic acid esters, such as ethyl acetate, ethyl benzoate, dimethyl phthalate, dibutyl phthalate, dioctyl phthalate, methyl formate, triacetin, diethyl oxalate, and dioctyl terphthalate; aromatic hydrocarbons, such as benzene, and loweralkyl benzenes, such as toluene, ethyl benzene, and butylbenzene; chlorinated hydrocarbons, such as chlorobenzene, o-dichlorobenzene, m-dichlorobenzene, chloroform, carbon tetrachloride, hexachloroethane, and tetrachlorotetrafluoropropane.

The preferred solvents are dibutyl phthalate, dimethyl phthalate and mixtures thereof employed in sufficient quantities to at least partially suspend or solubilize the constituents.

In general, any fluorescent compound which is stable in the presence of the activator and the oxalate type ester and which has a spectral emission falling between about 330 millimicrons and 1200 millimicrons and which is at least partially soluble in the solvent selected is suitable for use in the present invention. Suitable fluorescers include, for example, polycyclic aromatic compounds having at least three fused rings, such as anthracene, substituted anthracene, benzathracene, phenanthrene, substituted phenanthrene, napthacene, substituted naphthacene, pentacene, substituted pentacene, perylene, substituted perylene, and the like. Typical substituents for all of these are phenyl, lower alkyl ($C_1$–$C_6$), chloro, bromo, cyano, alkoxy ($C_1$–$C_{16}$), and other like substituents which do not interfere with the light generating reaction contemplated therein. The preferred fluorescers are 9,10-bis(phenylethynyl)anthracene, 1-methoxy-9,10-bis(phenylethynyl)anthracene, 9,10-diphenylanthracene, perylene 1,5-dichloro-9,10-bis(phenyl ethynyl)anthracene and rubrene.

The polymeric additives are one or more polymers selected from the class consisting of: (1) homopolymers and copolymers of poly(alkylene oxides); (2) homopolymers and copolymers of poly(vinyl alkyl esters) and poly(vinyl alkyl ethers) with the optional inclusion of minor amounts of alkylenes and styrenes in said copolymers; (3) copolymers of maleic anhydride with alkylenes and styrenes; (4) cellulose esters and mixed cellulose esters of 2-, 3- and 4-carbon acids and mixtures of said esters with the poly(alkylene oxides).

It is preferred to employ polymers having an average molecular weight in the range of from about $1.0 \times 10^3$ to about $5 \times 10^6$. These are available from a variety of commercial sources and can be prepared by conventional procedures as described in the polymer literature; see, for example, Polymer Handbook, J. Brandrup et al., Interscience Publishers, N.Y. (1966), and references cited therein.

Suitable polyalkylene oxides can be prepared by polymerizing one or more olefin oxides of the following formula:

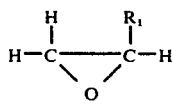

wherein $R_1$ is the same or different and selected from hydrogen and lower alkyl groups from $C_1$ to $C_4$, such as, methyl, ethyl, n-propyl, i-propyl, n-butyl, t-butyl; or phenyl groups. Suitable compounds include, for example, poly(ethylene oxide), poly(propylene oxide), poly(hexylene oxide), poly(ethylene oxide co-propylene oxide), and the like.

Suitable poly(vinyl alkyl alkyl esters) can be prepared by polymerizing one or more compounds of the following formula:

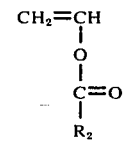

wherein $R_2$ is the same or different lower alkyl groups from $C_1$ to $C_3$, such as: methyl, ethyl, n-propyl and iso-propyl. Suitable polymers of this class include, for example, poly(vinyl acetate), poly(vinyl propionate), poly(vinyl butyrate), poly(vinyl acetate-co-vinyl propionate) and the like.

Suitable poly(vinyl alkyl ethers) can be prepared by polymerizing one or more compounds of the formula:

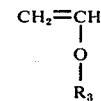

wherein $R_3$ is the same or different alkyl groups from $C_1$ to $C_{18}$, such as, methyl, ethyl, n-propyl, n-butyl, t-butyl, n-pentyl, n-hexyl, n-heptyl, n-octyl, n-nonyl, n-decyl, n-octadecyl and the like. Suitable polymers include, for example, poly(vinyl methyl ether), poly(vinyl ethyl ether), poly(vinyl isopropyl ether), poly(vinyl octadecyl ether), poly(vinyl methyl ether-co-vinyl ethyl ether) and the like.

Illustrative of alkylenes suitably employed in preparing the copolymers are 1-alkylenes from $C_2$ to $C_8$. Suitable monomers include ethylene, propylene, 1-butylene, 1-octylene and the like.

The alkylene and styrene containing copolymers may be prepared by employing minor amounts; namely, less than 50% on a mole basis, of one or more of these monomers, such as, ethylene, styrene, $\alpha$-methyl styrene and the like with one or more of the vinyl alkyl esters or vinyl alkyl ethers. 1:1 Alternating copolymers are employed in the case of maleic anhydride. The other copolymers can be in various configurations, such as, random, block, graft copolymers and the like. Suitable copolymers include, for example, poly(vinyl methyl ether-co-maleic anhydride), poly(styrene-co-maleic anhydride), poly(ethylene-co-vinyl acetate), poly(ethylene-$\alpha$-vinyl butyrate), poly(ethylene-co-vinyl ethyl ether) and the like.

The cellulose esters and mixed esters used in the present invention are the esterification products corresponding to the condensation products of carboxylic acids in the C-2 to C-6 range with the hydroxyl groups of the cellulose chain.

Suitable esters include, for example, cellulose acetate, cellulose propionate, cellulose butyrate, cellulose acetate butyrate, cellulose hexanoate and the like. The esters can be prepared by a variety of conventional procedures and a variety are readily available from various commercial sources. Suitable esters can be widely varied with regard to ester content and viscosity. Preferred esters have a carboxyl weight percent in the range of from about 35 to about 60 and a viscosity in the range of from about 1.1 poises to about 200 poises. Half Second Butyrate by Eastman Kodak Co. having 37 wt. % butyryl content and 13 wt. % acetyl content and a viscosity of 1.12 to 1.88 poises as determined by ASTM method D-1343-54T in solution A of D-871-54T is preferred.

The preferred activator components comprise hydrogen peroxide as the activator, an organic base catalyst, a solvent and optionally the viscosity control agent. The latter can alternatively be incorporated in the oxalate component or be present in both components.

It is preferred to employ the above ingredients in sufficient quantities to establish the following concentration ranges in the final chemiluminescent compositions: $H_2O_2$, from about 0.01M to about 10M; catalyst from zero to about $1.0 \times 10^{-2}$M with an upper limit of about $1.0 \times 10^{-3}$M being especially preferred; polymeric compound from about 0.05 to about 10% by weight, preferably 0.1 to 5%.

The preferred oxalate components comprise the oxalate type ester, the fluorescer, a solvent and the polymeric compound.

The following Specific Examples are set forth to illustrate the invention to teach persons skilled in the art to practice the invention and are not intended to be limitative.

EXAMPLE 1

A chemiluminescent system is described in copending, commonly assigned application U.S. Ser. No. 842,134, filed July 16, 1969, non abandoned and refiled as Ser. No. 124,142, filed Mar. 15, 1971, now U.S. Pat. No. 3,749,679 which is more superior to other known chemiluminescent systems. However, its maximum light output is about 250–300 lm hr $1^{-1}$, since the light capacity and quantum yields are decreased as the ester concentration is increased beyond 0.10M. This loss in efficiency is shown by the experiments summarized in Table I. The light capacity of 147 lm hr $1^{-1}$ obtained at 0.30M ester concentration is substantially lower than the 257 lm hr $1^{-1}$ for a 0.10M CPPO system.

TABLE I

EFFECT OF CPPO CONCENTRATION ON CHEMILUMINESCENCE EFFICIENCY[a]

| CPPO M | Intensity (ft. lmbt. cm$^{-1}$ vs. time) | | | | | | Q.Y.[b] | Lt. Cap.[c] |
|---|---|---|---|---|---|---|---|---|
| | 2 min. | 10 min. | 30 min. | 60 min. | 120 min. | 180 min. | | |
| 0.010 | 11.6 | 14.7 | 7.0 | 0.4 | .01 | — | 10.1 | 29 |
| 0.100 | 20.5 | 16.0 | 12.6 | 7.9 | 4.3 | 2.5 | 9.1 | 257 |
| 0.200 | 18.2 | 14.3 | 10.4 | 6.9 | 3.8 | 1.8 | 3.9 | 220 |
| 0.300 | 12.8 | 11.9 | 9.2 | 5.3 | 1.8 | 0.7 | 1.7 | 147 |

[a]Reaction in 75% dibutyl phthalate, 20% dimethyl phthalate, 5% tert butanol: $2.25 \times 10^{-3}$M bis phenyl-ethynylanthracene (BPEA) 0.375M $H_2O_2$ and $2 \times 10^{-4}$ sodium salicylate. CPPO is bis(2,4,5-trichloro-6-carbopentoxyphenyl) oxalate.
[b]Chemiluminescence quantum yield in einsteins mole$^{-1}$ × 10$^{-2}$.
[c]Integrated light capacity in lumen hours liter$^{-1}$.

EXAMPLE II

This Example shows that the light capacity and quantum yield of oxalate chemiluminescent reactions is increased by including various polymers in low concentration in the system. The systems described here are two-component nonviscous solutions, and are quite different from the three-component thixotropic chemiluminescent systems, in which some polymers although in much higher concentrations are used in admixture with silica as described in copending, commonly assigned application U.S. Ser. No. 118,165, filed Feb. 23, 1971, now U.S. Pat. No. 3,718,614.

The substantial increase in light output of an oxalate chemiluminescent system obtained with systems containing 0.3–0.6% polymers is shown in Table II. In the examples provided an oxalate component containing bis(2,4,5-trichloro-6-carbopentoxyphenyl)oxalate (CPPO) 9,10-bis(phenylethynyl)anthracene (BPEA) and polymer in dibutyl phthalate was mixed with an activator component which contained hydrogen peroxide and sodium salicylate in 80% dimethyl phthalate and 20% t-butyl alcohol. By using 0.4 wt % of the cellulose acetate butyrate (Half-second Butyrate) and 0.4 wt % of the polyethylene oxide (Polyox WSRN-80) in the oxalate component, so that the final concentration of polymers in the mixed system is 0.3 wt %, the light capacity is increased to 353 lm hr $1^{-1}$(experiment 2). An increase in light capacity was also observed at higher concentrations (0.138 and 0.177M) of CPPO (experiments 6 and 8). The light capacity of 379 lm hr $1^{-1}$ for experiment 8 is 42% higher than the 268 value for a 0.177M CPPO system without polymers. In addition, experiments 10 and 11 show that a poly(vinyl ethyl ether) (EDBM) and a polyethylene oxide (Polyox WSR-205) can also be used to increase the light output of CPPO systems.

TABLE II

Effects of Various Polymers on Light Capacity of CPPO Chemiluminescence[a]
Concentration in Mixed System

| Exp. | CPPO | $H_2O_2$ | BPEA (10$^3$M) | Sed. Sal. (10$^4$M) | Half-second[b] Butyrate | WSRN-80[b] | EDEM[b] | WBR-205[b] |
|---|---|---|---|---|---|---|---|---|
| 1 | 0.10 | 0.375 | 2.25 | 1.25 | — | — | — | — |
| 2 | 0.10 | 0.375 | 2.25 | 1.25 | 0.32 | 0.34 | — | — |
| 3 | 0.10 | 0.375 | 2.25 | — | 0.32 | 0.34 | — | — |
| 4 | 0.10 | 0.375 | 2.25 | 1.25 | — | — | 0.23 | 0.375 |
| 5 | 0.10 | 0.375 | 2.25 | 1.25 | — | — | 0.23 | 0.23 |
| 6 | 0.138 | 0.441 | 2.22 | 1.47 | 0.30 | 0.32 | — | — |
| 7 | 0.177 | 0.50 | 2.0 | 1.67 | — | — | — | — |
| 8 | 0.177 | 0.50 | 2.0 | 1.67 | 0.28 | 0.30 | — | — |
| 9 | 0.177 | 0.50 | 2.0 | — | 0.28 | 0.30 | — | — |

TABLE II-continued

Effects of Various Polymers on Light Capacity of CPPO Chemiluminescence[a]

| | | | | | | | | | | |
|---|---|---|---|---|---|---|---|---|---|---|
| 10 | 0.177 | 0.50 | 2.0 | 1.67 | — | | — | | 0.20 | 0.33 |
| 11 | 0.177 | 0.50 | 2.0 | 1.67 | — | | — | | 0.20 | 0.20 |

Intensity (ft.) H. cm$^{-1}$ vs. Time (min.)

| Exp. | 2 | 10 | 20 | 30 | 60 | 90 | 120 | 150 | 180 | Light Capacity | Quantum Yield |
|---|---|---|---|---|---|---|---|---|---|---|---|
| 1 | 21 | 16 | 15 | 12 | 7.8 | 5.4 | 3.7 | 2.5 | 2.0 | 298 | 10.5 |
| 2 | 24 | 19 | 12 | 9.0 | 6.8 | 6.4 | 5.7 | 4.7 | 4.1 | 353 | 12.5 |
| 3 | 19 | 16 | 11 | 9.2 | 6.0 | 5.1 | 4.2 | 3.4 | 3.3 | 274 | 9.7 |
| 4 | 26 | 14 | 11 | 9.0 | 6.5 | 5.6 | 4.7 | 3.7 | 3.2 | 281 | 10.1 |
| 5 | 25 | 12 | 8.6 | 7.5 | 5.0 | 4.2 | 3.2 | 2.1 | | 210 | 7.4 |
| 6 | 24 | 16 | 10 | 8.8 | 7.5 | 5.5 | 4.7 | 3.9 | 3.4 | 314 | 8.0 |
| 7 | 27 | 16 | 14 | 11 | 7.2 | 5.2 | 3.5 | 7.3 | 1.6 | 269 | 5.4 |
| 8 | 29 | 19 | 13 | 10 | 8.5 | 7.4 | 6.0 | 4.8 | 4.0 | 379 | 7.5 |
| 9 | 15 | 18 | 13 | 11 | 6.9 | 5.8 | 4.7 | 3.7 | 3.5 | 314 | 6.2 |
| 10 | 41 | 19 | 14 | 12 | 7.6 | 6.0 | 4.5 | 3.4 | 3.0 | 322 | 6.4 |
| 11 | 35 | 17 | 13 | 11 | 7.5 | 6.4 | 4.8 | 3.8 | 3.4 | 342 | 6.8 |

[a]Dibutyl phthalate was solvent for oxalate component dimethyl phthalate (80%) and t-butyl alcohol (20%) NRS solvent system for activator component. Ratio of oxalate component to activator component was 3:1 for experiments 1–5, 3:1.25 for experiment 6 and 3:1.5 for experiments 7–11.
[b]concentration of polymers is in weight percent. WSRN-80 is polyethylene oxide, EDEM is a poly(vinyl ethyl ether) and Half-second Butyrate is a cellulose acetate-butyrate.

EXAMPLE III

In this Example, the effect of varying concentrations of polymer compound in the chemiluminescent system is illustrated. The results are shown in Table III. The results indicate that the polymer is effective to increase light capacity at over a range of concentrations.

EXAMPLE IV

This example illustrates the effect of varying the molecular weight of the polymer added to the chemiluminescent system. The results indicate that a wide range of molecular weights is effective.

Table IV

Effect of Polyox[a] Mol. Wt. on Chemiluminescence Performance[b]

| Polyox Mol. Wt. × 10$^3$ | Polyox Conc. % | Q.Y. × 10$^2$ | Lt. Cap. | T 75 | 2 min. | 10 min. | 30 min. | 60 min. | 90 min. | 120 min. | 180 min. | 240 min. |
|---|---|---|---|---|---|---|---|---|---|---|---|---|
| 1 | .75 | 9.12 | 548 | 353 | 34.9 | 20.9 | 15.4 | 12.2 | 10.0 | 8.4 | 6.1 | 4.3 |
| 4 | .75 | 9.47 | 569 | 292 | 37.1 | 21.8 | 16.1 | 13.3 | 11.4 | 9.7 | 6.8 | 5.0 |
| 6 | .75 | 8.59 | 516 | 431 | 25.0 | 12.2 | 8.5 | 7.4 | 7.2 | 7.4 | 6.8 | 6.0 |
| 20 | .75 | 8.62 | 518.2 | 310 | 30.4 | 17.2 | 12.9 | 11.0 | 9.8 | 8.5 | 6.2 | 4.8 |
| 100 | .75 | 9.18 | 551 | 292 | 61.1 | 27.3 | 16.3 | 11.2 | 9.2 | 7.7 | 6.1 | 4.9 |
| 200 | .75 | 9.28 | 558 | 240 | 49.9 | 28.7 | 16.7 | 12.7 | 9.7 | 8.0 | 6.0 | 5.1 |
| 300 | .75 | 8.80 | 529 | 530 | 54.3 | 25.2 | 14.2 | 9.8 | 7.7 | 6.5 | 4.8 | 3.9 |
| 600 | .75 | 7.40 | 444 | 399 | 46.0 | 21.2 | 11.9 | 7.6 | 6.2 | 5.3 | 4.4 | 3.7 |
| 1 | .3 | 8.99 | 540 | 345 | 31.2 | 20.6 | 16.1 | 12.7 | 10.1 | 8.3 | 6.0 | 4.5 |
| 4 | .3 | 8.98 | 540 | 225 | 36.6 | 23.4 | 17.8 | 13.6 | 10.9 | 9.0 | 6.3 | 4.6 |
| 6 | .3 | 8.47 | 509 | 436 | 26.5 | 13.4 | 9.2 | 7.7 | 7.3 | 7.2 | 6.6 | 5.6 |
| 20 | .3 | 7.17 | 431 | 398 | 23.0 | 11.7 | 8.3 | 6.8 | 6.2 | 5.8 | 5.1 | 4.3 |
| 100 | .3 | 7.84 | 471 | 322 | 48.2 | 21.3 | 12.3 | 8.9 | 7.5 | 6.4 | 5.2 | 4.4 |
| 200 | .3 | 7.51 | 452 | 272 | 43.5 | 22.0 | 12.9 | 9.4 | 7.5 | 6.3 | 4.7 | 3.7 |
| 300 | .3 | 7.51 | 451 | 341 | 35.9 | 18.5 | 11.1 | 8.2 | 6.7 | 5.8 | 4.6 | 3.9 |
| 600 | .3 | 7.72 | 464 | 355 | 38.6 | 18.4 | 11.4 | 8.3 | 6.7 | 5.9 | 4.7 | 4.0 |

[a]Polyox is Union Carbide's polyoxyethylene glycol.
[b]Chemiluminescent reactions contained 5.67 × 10$^{-3}$ M 1,8-dichloro-9,10-bis(phenylethynyl)anthracene (1,8-DCBPEA), 1.56 × 10$^{-4}$ M sodium salicylate 0.375 M H$_2$O$_2$ and 0.21 M bis(2,4,5-trichloro-6-carbopentoxyphenyl)oxalate (CPPO) in a solvent of 75% dibutyl phthalate, 20% dimethyl phthalate, 5% t-butanol. The oxalate component containing CPPO, 1,3-DCBPEN and the Polyox was heated at 80° C for 5 to 10 minutes to effect complete solution of the polymers.

We claim:
1. A chemiluminescent composition consisting essentially of a liquid solution in organic solvent of

TABLE III

EFFECT OF POLYOX CONCENTRATION ON CHEMILUMINESCENCE PERFORMANCE[a]

| Conc. Polyox WSRN-80[b] | Q.Y. × 10$^2$ | Lt. Cap. | T-75 | Intensity (Foot Lamberts cm$^{-1}$) vs. Time (Minutes) | | | | | | | | |
|---|---|---|---|---|---|---|---|---|---|---|---|---|
| | | | | 2 | 30 | 30 | 60 | 90 | 120 | 180 | 240 | 420 |
| 0 | 7.10 | 427 | 181 | 46.8 | 30.0 | 17.5 | 10.3 | 8.0 | 6.3 | 4.5 | 3.3 | .9 |
| .1% | 8.56 | 515 | 238 | 46.4 | 23.3 | 15.2 | 11.1 | 9.2 | 8.0 | 6.2 | 5.1 | 2.7 |
| .3 | 9.97 | 599 | 271 | 58.3 | 29.2 | 18.2 | 12.6 | 9.8 | 8.3 | 6.3 | 5.1 | 2.7 |
| .50 | 9.42 | 566 | 219 | 60.2 | 31.0 | 19.3 | 13.3 | 9.9 | 8.0 | 6.3 | 4.9 | 2.0 |
| .75 | 10.15 | 610 | 221 | 70.7 | 36.3 | 21.1 | 13.3 | 10.3 | 8.0 | 6.1 | 4.6 | 2.0 |
| .75 | 10.11 | 607 | 285 | 58.6 | 31.3 | 19.1 | 13.4 | 10.3 | 8.6 | 6.1 | 4.4 | 2.5 |
| 1.0 | 9.58 | 576 | 204 | 60.6 | 34.2 | 19.9 | 14.1 | 10.9 | 9.0 | 6.2 | 5.1 | 1.4 |
| 1.0 | 9.93 | 597 | 202 | 72.7 | 40.0 | 21.0 | 13.4 | 10.3 | 8.7 | 6.8 | 5.0 | 2.0 |

[a]Chemiluminescent reactions contained 5.67 d 10$^{-3}$ M 1,8-dichloro-9,10-bis(phenyl-ethynyl)anthracene (1,8-DCBPEA), 1.56 × 10$^{-4}$ M sodium salicylate, 0.375 M H$_2$O$_2$ and 0.21 M bis(2,4,5-trichloro-6-carbopentoxyphenyl)oxalate (CPPO) in a solvent of 75% dibutyl phthalate, 20% dimethylphthalate, 5% t-butanol. The oxalate component containing CPPO, 1,8-DCBPEA and the Polyox was heated at 80° C for 5 to 10 minutes to effect complete solution of the polymers.
[b]Polyox WSRN-80 is Union Carbide's polyethylene oxide (mol. wt. 300,000).

a bis-ester of oxalic acid, an organic fluorescent compound and hydrogen peroxide, present in relative proportions to produce chemiluminescent light and from about 0.05% to about 10% by weight of the chemiluminescent composition of a polymeric additive having average molecular weight from $10^3$ to about $5 \times 10^6$ and selected from the class consisting of:

1. polymers of monomers consisting of one or more of alkylene oxides having the formula

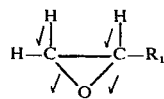

wherein $R_1$ is H or alkyl $C_1$ to $C_4$;

2. polymers of monomers consisting of one or more of vinyl alkyl esters having the formula

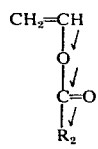

wherein $R_2$ is alkyl $C_1$ to $C_3$, and vinyl alkyl ethers having the formula

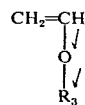

wherein $R_3$ is alkyl $C_1$ to $C_{18}$;

3. copolymers of one or more of said vinyl alkyl esters and ethers with minor amounts of one or more monomers selected from the group consisting of 1-alkylene having 2 to 8 carbon atoms and styrene;

4. alternating copolymers of maleic anhydride with monomers selected from the group consisting of 1-alkylene having 2 to 8 carbon atoms and styrene;

5. cellulose esters and mixed cellulose esters of 2-, 3- and 4-carbon acids and mixtures of said esters with polymers of alkylene oxides having the formula defined above.

2. A composition according to claim 1 wherein said organic fluorescer is selected from 9,10-bis(phenylethynyl)anthracene and methoxy- and halo- substituted derivatives thereof, rubrene and perylene.

3. A composition according to claim 1 further comprising a basic catalyst.

4. A composition according to claim 3 wherein said polymeric additive is a member selected from the group consisting of: poly(vinyl ethyl ether), poly(vinyl methyl ether), poly(vinyl isobutyl ether), poly(vinyl acetate) and mixtures thereof.

5. A composition according to claim 3 wherein the oxalate ester is bis(2-carbobutoxy-3,4,6-trichlorophenyl)oxalate or bis(2-carbopentoxy-3,4,6-trichlorophenyl)oxalate.

6. A composition according to claim 5 wherein said polymeric agent is poly(vinyl ethyl ether).

7. A composition according to claim 3 wherein said polymeric additive is cellulose ester or mixed cellulose ester of 2-, 3- and 4-carbon acids and mixtures of said esters with poly(alkylene oxides).

8. A composition according to claim 7 wherein said polymeric additive is a cellulose acetate butyrate.

* * * * *